(12) United States Patent
Lehr et al.

(10) Patent No.: US 7,368,031 B2
(45) Date of Patent: May 6, 2008

(54) LAMINATE INLAY PROCESS FOR SPORTS BOARDS

(75) Inventors: Gregory S. Lehr, Coronado, CA (US); Alberto Rubio, San Diego, CA (US); Salvador Gallegos, Tijuana (MX)

(73) Assignee: Wham-O, Inc., Emeryville, CA (US)

( * ) Notice: Subject to any disclaimer, the term of this patent is extended or adjusted under 35 U.S.C. 154(b) by 330 days.

(21) Appl. No.: 10/716,047

(22) Filed: Nov. 17, 2003

(65) Prior Publication Data

US 2004/0151875 A1     Aug. 5, 2004

Related U.S. Application Data

(63) Continuation-in-part of application No. 10/359,018, filed on Feb. 4, 2003.

(51) Int. Cl.
*B32B 37/00* (2006.01)

(52) U.S. Cl. ............ 156/263; 156/256; 156/267

(58) Field of Classification Search ........... 156/250, 156/256, 263, 267, 510, 513, 516, 519, 521, 156/444, 582

See application file for complete search history.

(56) References Cited

U.S. PATENT DOCUMENTS

| 632,738 A | 9/1899 | O'Hara |
| 670,995 A | 4/1901 | Moore |
| 1,352,998 A | 9/1920 | Thompson |
| D183,016 S | 6/1958 | O'Herron |
| 2,875,720 A | 3/1959 | Hupp |
| 3,070,817 A | 1/1963 | Kohrn et al. |
| 3,207,646 A | 9/1965 | Hackländer |
| 3,269,882 A | 8/1966 | Willy |
| 3,276,050 A | 10/1966 | Edwards |
| 3,325,332 A | 6/1967 | Cleereman |
| 3,326,564 A | 6/1967 | Heuvel |
| 3,378,274 A | 4/1968 | Poppen |
| 3,414,919 A | 12/1968 | Gust |
| 3,502,540 A | 3/1970 | Pietrocola |
| 3,514,798 A | 6/1970 | Ellis |
| 3,543,315 A | 12/1970 | Hoffman |
| 3,732,839 A | 5/1973 | Schuster et al. |
| 3,737,365 A * | 6/1973 | Smith ................. 428/67 |
| 3,755,063 A | 8/1973 | Massey et al. |
| 3,776,563 A | 12/1973 | Tigert |

(Continued)

FOREIGN PATENT DOCUMENTS

DE     3019-535     11/1981

(Continued)

*Primary Examiner*—James Sells
(74) *Attorney, Agent, or Firm*—James A. Fox; John M. McCormack, Esq.; Heller Ehrman LLP

(57) ABSTRACT

The present invention provides a method for inlaying a design into a laminate sheet and bonding the inlaid laminate sheet to a core structure or core substrate. The method of the present invention includes the steps of die cutting a preselected inlay design out of a laminate sheet, die cutting a congruent insert to be placed in the aperture left by the die cut design, securing the insert into the die cut design aperture, laminating with heat and pressure the laminate sheet to a core material, and conducting a finishing operation such as trimming to clean the excess laminate sheet from around the edges of the core material.

36 Claims, 4 Drawing Sheets

U.S. PATENT DOCUMENTS

| | | | |
|---|---|---|---|
| 3,814,417 | A | 6/1974 | Catlin |
| 3,823,047 | A | 7/1974 | Colombo |
| 3,829,343 | A | 8/1974 | Remmert |
| 3,857,915 | A | 12/1974 | Crowley |
| 3,918,114 | A | 11/1975 | Schmitt |
| 3,930,917 | A | 1/1976 | Esakov et al. |
| 3,937,482 | A | 2/1976 | Johnson |
| 4,062,711 | A * | 12/1977 | Davis .................... 156/244.25 |
| 4,071,264 | A | 1/1978 | Legrand et al. |
| 4,091,154 | A | 5/1978 | Hirai |
| 4,092,198 | A | 5/1978 | Scher et al. |
| 4,118,050 | A | 10/1978 | Schnurrenberger |
| 4,129,911 | A | 12/1978 | McDonald et al. |
| 4,209,867 | A | 7/1980 | Abrams, III |
| D258,516 | S | 3/1981 | Slingerland |
| 4,273,816 | A | 6/1981 | Tollette |
| 4,297,796 | A | 11/1981 | Stirtz et al. |
| 4,375,199 | A | 3/1983 | Graeme-Barber et al. |
| 4,399,086 | A | 8/1983 | Walter |
| 4,406,628 | A | 9/1983 | Rademacher |
| 4,457,729 | A | 7/1984 | Peerlkamp |
| 4,533,150 | A | 8/1985 | Hardy |
| 4,539,057 | A | 9/1985 | Ahlm |
| 4,561,664 | A | 12/1985 | Cashmere |
| 4,562,784 | A | 1/1986 | Lineback |
| 4,571,195 | A | 2/1986 | Brooks, Jr. |
| 4,603,650 | A | 8/1986 | Björn |
| 4,621,002 | A | 11/1986 | Kuhlmann et al. |
| 4,666,171 | A | 5/1987 | Sellers |
| 4,706,910 | A | 11/1987 | Walsh et al. |
| 4,713,032 | A | 12/1987 | Frank |
| 4,740,258 | A | 4/1988 | Breitscheidel |
| 4,752,260 | A | 6/1988 | Stewart |
| 4,753,836 | A | 6/1988 | Mizell |
| 4,797,312 | A | 1/1989 | Sherwood |
| 4,806,412 | A | 2/1989 | Wank et al. |
| 4,848,786 | A | 7/1989 | Mankau |
| 4,850,913 | A | 7/1989 | Szabad, Jr. |
| 4,857,380 | A | 8/1989 | Kent |
| 4,878,980 | A | 11/1989 | Stedman |
| 4,892,054 | A | 1/1990 | Davidson |
| 4,894,034 | A | 1/1990 | Brown, III |
| 5,052,963 | A | 10/1991 | Johnson, III |
| 5,114,370 | A | 5/1992 | Moran |
| 5,116,269 | A | 5/1992 | Moran |
| 5,181,745 | A | 1/1993 | Jacobsen et al. |
| 5,211,593 | A | 5/1993 | Schneider et al. |
| 5,224,890 | A | 7/1993 | Moran |
| 5,234,638 | A | 8/1993 | Jang |
| 5,238,434 | A | 8/1993 | Moran |
| 5,275,860 | A | 1/1994 | D'Luzansky et al. |
| 5,286,545 | A * | 2/1994 | Simmons, Jr. .............. 428/192 |
| 5,295,883 | A | 3/1994 | Moran |
| 5,350,544 | A | 9/1994 | Bambara et al. |
| 5,460,871 | A | 10/1995 | Andersen |
| 5,480,721 | A | 1/1996 | Pozzoli et al. |
| 5,489,228 | A | 2/1996 | Richardson et al. |
| 5,503,921 | A | 4/1996 | Chang et al. |
| 5,647,784 | A | 7/1997 | Moran |
| 5,658,179 | A | 8/1997 | Glydon et al. |
| 5,797,779 | A | 8/1998 | Stewart |
| 5,882,776 | A | 3/1999 | Bambara et al. |
| 5,928,045 | A | 7/1999 | Szabad |
| 5,934,961 | A | 8/1999 | Mehrmann et al. |
| 5,944,570 | A | 8/1999 | Appleby |
| 6,054,005 | A | 4/2000 | Hurley et al. |
| 6,106,345 | A | 8/2000 | Yeh |
| 6,167,790 | B1 | 1/2001 | Bambara et al. |
| 6,224,706 | B1 | 5/2001 | Matich |
| 6,391,438 | B1 | 5/2002 | Ramesh et al. |
| 6,394,864 | B2 | 5/2002 | Scharl |
| 6,416,614 | B1 | 7/2002 | Ziegler |
| 6,492,013 | B1 | 12/2002 | Ramesh |
| 2003/0003293 | A1 | 1/2003 | Ramesh |
| 2003/0008575 | A1 | 1/2003 | Leonard |

FOREIGN PATENT DOCUMENTS

| | | |
|---|---|---|
| DE | 3146381 A1 | 6/1983 |
| DE | 3124768 A1 | 8/1983 |
| DE | 3206334 A1 | 9/1983 |
| DE | 3406-689 A | 8/1985 |
| DE | 3625413 A1 | 2/1988 |
| DE | 3839-805 A | 5/1990 |
| GB | 357637 | 9/1931 |
| WO | WO80/01673 | 8/1980 |
| WO | WO83/00127 | 1/1983 |

* cited by examiner

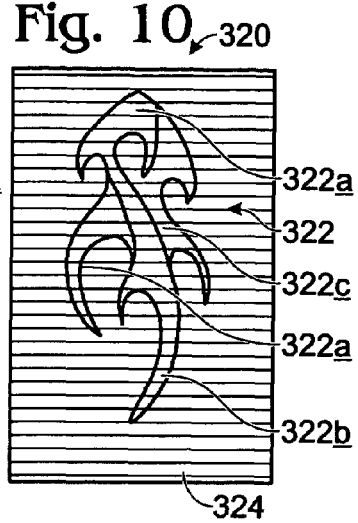
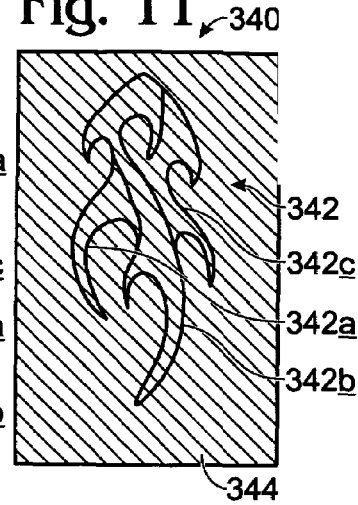
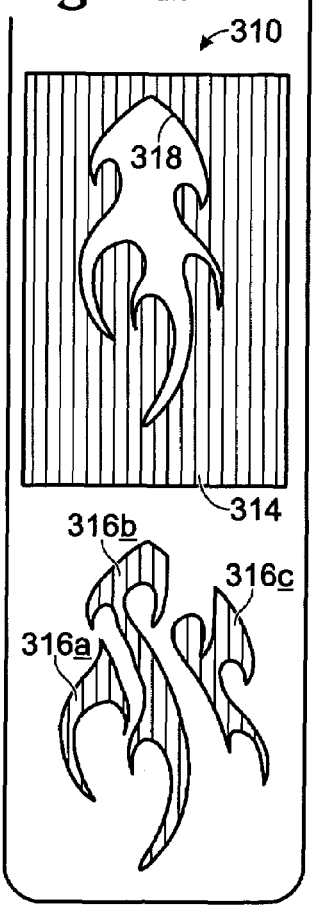
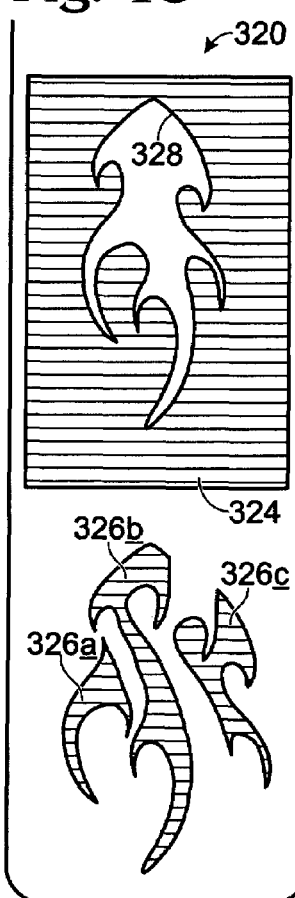
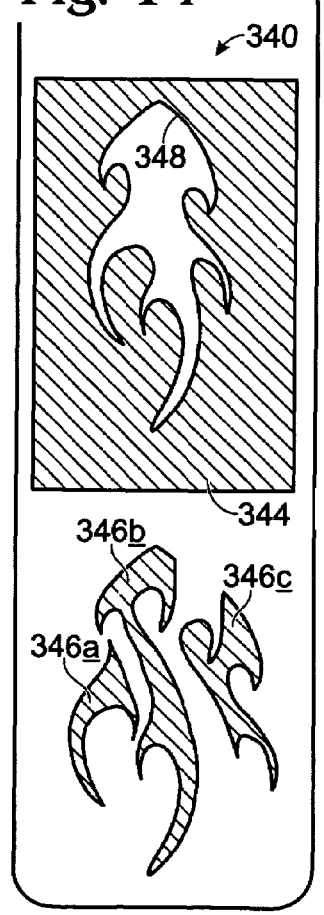

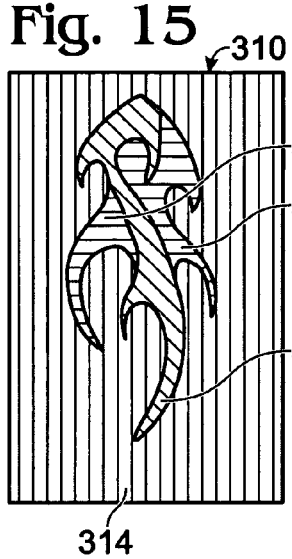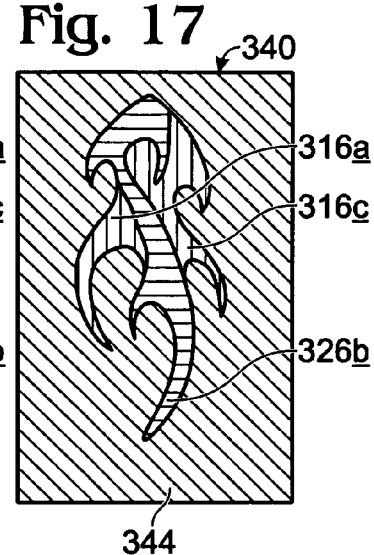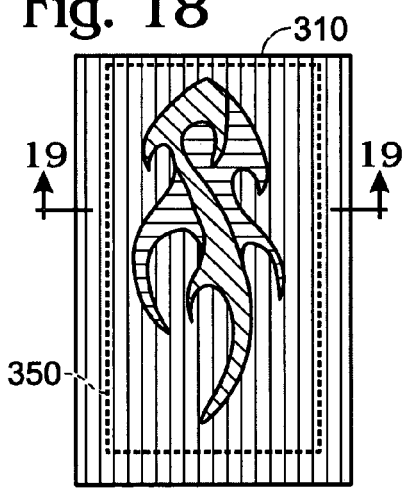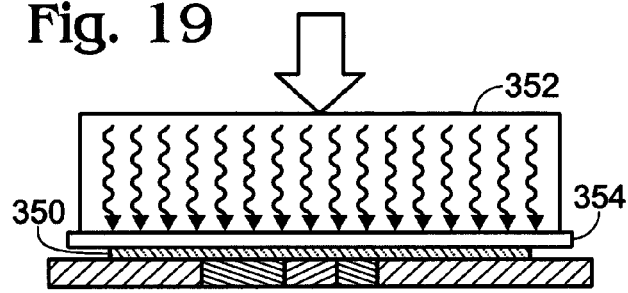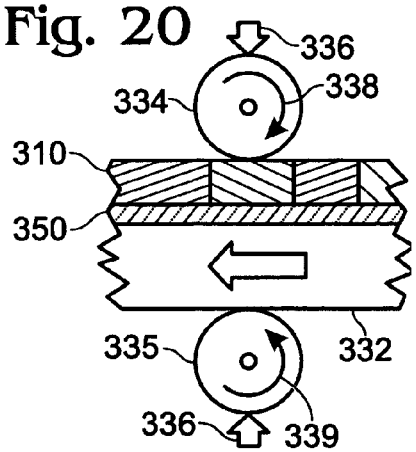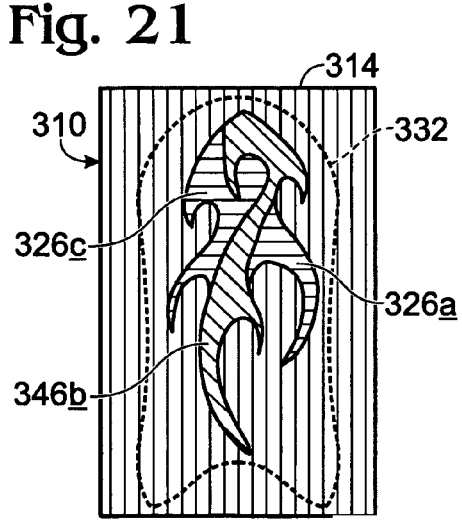

US 7,368,031 B2

LAMINATE INLAY PROCESS FOR SPORTS BOARDS

CROSS-REFERENCE TO RELATED APPLICATIONS

This application is a continuation-in-part of and claims priority to U.S. patent application Ser. No. 10/359,018, filed Feb. 4, 2003 and entitled "Laminate Inlay Process for Sports Boards".

FIELD OF THE INVENTION

The present invention relates generally to a method for creating an inlay pattern in a laminate sheet. More specifically, the present invention relates to a method for creating an inlay pattern in a laminate sheet and laminating the inlaid sheet into a composite laminate structure. The present invention finds particular utility for the top skin for a sports board, such as a snow sled or bodyboard.

BACKGROUND OF THE INVENTION

Laminate sheets are useful in a variety of manufacturing processes. Laminate sheets may be bonded together to form a composite structure having layers of different materials. For example, foam core structures may have protective layers of laminated sheets attached to the outer surface thereof. Typical uses are again, snow sleds and bodyboards.

SUMMARY OF THE INVENTION

The present invention provides a method for inlaying a design into a laminate sheet and bonding the inlaid laminate sheet to a core structure or core substrate. The method of the present invention includes the steps of die cutting a preselected inlay design out of a laminate sheet, die cutting a congruent insert to be placed in the aperture left by the die cut design, securing the insert into the die cut design aperture, laminating with heat and pressure the laminate sheet to a core material, and conducting a finishing operation such as trimming to clean the excess laminate sheet from around the edges of the core material.

BRIEF DESCRIPTION OF THE DRAWINGS

FIG. 9 is a plan view of a laminate sheet having a die cut inlay design cut therein according to an embodiment of the present invention.

FIG. 10 is a plan view of a laminate sheet having a die cut inlay design cut therein according to an embodiment of the present invention.

FIG. 11 is a plan view of a laminate sheet having a die cut inlay design cut therein according to an embodiment of the present invention.

FIG. 12 is a plan view of the laminate sheet of FIG. 9, showing the die cut inlay design removed leaving an inlay aperture.

FIG. 13 is a plan view of the laminate sheet of FIG. 10, showing the die cut inlay design removed leaving an inlay aperture.

FIG. 14 is a plan view of the laminate sheet of FIG. 11, showing the die cut inlay design removed leaving an inlay aperture.

FIG. 15 is a plan view of the laminate sheet of FIG. 9, with die cut inlay design insert pieces from the inserts of the sheets of FIGS. 10 and 11 inserted into the inlay aperture.

FIG. 16 is a plan view of the laminate sheet of FIG. 10, with die cut inlay design insert pieces from the inserts of the sheets of FIGS. 9 and 11 inserted into the inlay aperture.

FIG. 17 is a plan view of the laminate sheet of FIG. 11, with die cut inlay design insert pieces from the inserts of the sheets of FIGS. 9 and 10 inserted into the inlay aperture.

FIG. 18 is a plan view of the laminate sheet of FIG. 15, with a bonding sheet overlaid the inlay design.

FIG. 19 is a schematic side view of a bonding process for attaching the bonding sheet overlaid the inlay design to the laminate sheet.

FIG. 20 is a schematic illustration of the lamination of the laminate sheet to a sports board core.

FIG. 21 is a plan view of the laminate sheet of FIG. 15, shown bonded to a sports board core.

DETAILED DESCRIPTION OF THE INVENTION

Figure 1:
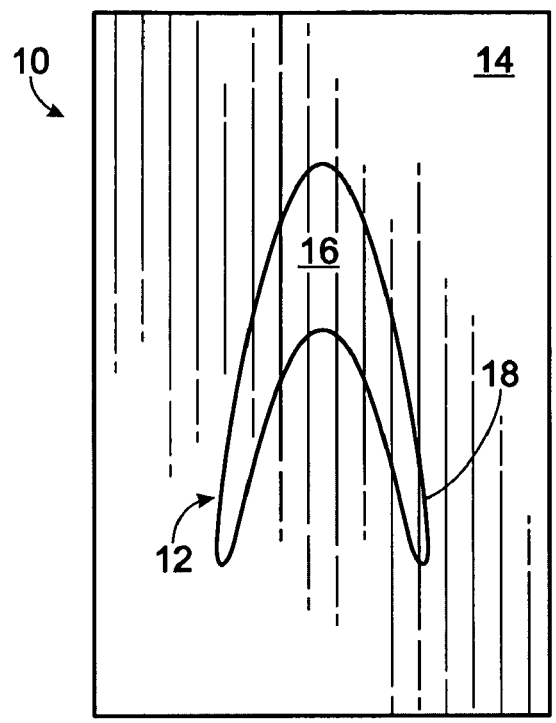
FIG. 1 is a plan view of laminate sheet having a die cut inlay design cut therein according to the present invention.

The present invention is a method for making and applying an inlaid laminate sheet to a core structure or core substrate, and is particularly useful for forming top skin designs on sports boards such as snow sleds and body boards. Top skin material may include polyethylene foam, in the range of about ⅟₁₆" to ¼" thick, and with a density in the range of about 4-8 lbs/ft³. A first laminate sheet 10 having a die cut inlay periphery or design 12 is shown in FIG. 1, and includes a surrounding expanse or portion 14 and an insert portion 16. Insert portion 16 fills a die cut design aperture 18. The shape and size of insert portion 16 and design aperture 18 are preselected, and are the same as the shape and size of inlay design 12.

Figure 2:
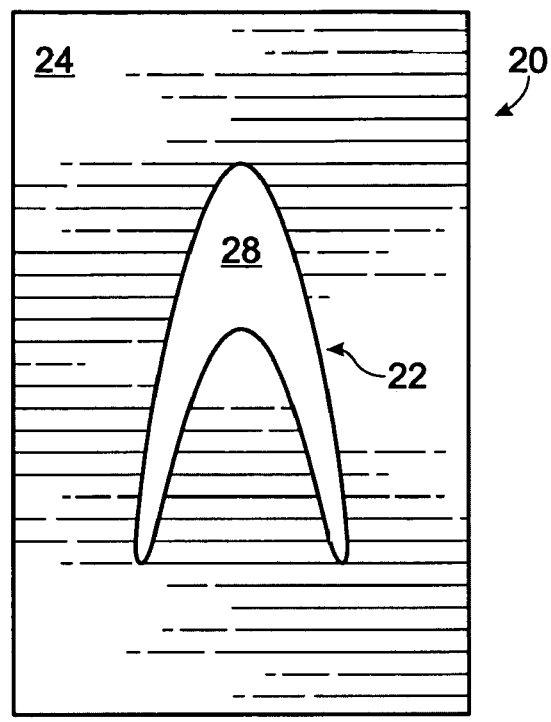
FIG. 2 is a plan view of a laminate sheet having a die cut inlay design removed, the laminate sheet having at least one different material characteristic than that of FIG. 1.

FIG. 2 shows a second laminate sheet 20, which includes a congruent die cut inlay design 22 sized and shaped to match die cut design 12 of FIG. 1. Second laminate sheet 20 further includes a surrounding expanse or portion 24 surrounding die cut design 22. An insert portion 26 has been removed from second laminate sheet 20 in FIG. 2, leaving a corresponding or matching design outline or aperture 28. Insert portion 26 is shown isolated in FIG. 3, prior to its being inlaid in another sheet.

Laminate sheet 10 and laminate sheet 20 are different from one another in at least one material characteristic. For example, laminate sheet 10 may be red in color and laminate sheet 20 may be blue in color. Other color differences may exist between laminate sheet 10 and laminate sheet 20. For example, laminate sheet 10 may be any color and laminate sheet 20 may be any other color including a lighter or darker shade of the same color as laminate sheet 10. The idea is contrasting colors, to enhance the appearance of the laminated sheet.

Other material characteristics may be different between laminate sheet 10 and laminate sheet 20. The surface properties of the sheets may be different. For example, sheet 10 may have a relatively low coefficient of friction and sheet 20 may have a relatively high coefficient of friction. Also the reverse may be true, and sheet 10 may have a relatively high coefficient of friction and sheet 20 may have a relative low coefficient of friction. Variation in the coefficient of friction may be the result of a surface treatment or an inherent material property. Increases in the coefficient of friction increase the purchase, or grip, that the surface has on an adjacent surface.

The matching die cut inlay designs 12 and 22 enable inserts 16 and 26 to be removed from sheets 10 and 20 and interchanged. Replacing insert 16 with insert 26 in sheet 10 makes a laminate sheet having an outer portion 14 of one material characteristic and an insert 26 of another material characteristic. Similarly, replacing insert 26 with insert 16 in sheet 20 makes a laminate sheet having an outer portion 24 of one material characteristic and an insert 16 of another material characteristic. The interchangeability may be used to enhance the characteristics of the composite structure. For example, if the composite structure is a snow sled or body board, an increase in the purchase of a rider surface may enhance the play value of the snow sled. The color of the insert may be different from that of the surrounding expanse, enhancing the visual aesthetics of the sports board.

Laminate sheet 10 may be a variety of polymer materials. For example, polyethylene, polystyrene, polypropylene, and polyvinylchloride may be used to form laminate sheet 10.

A method of making an inlaid laminate sheet and applying it to a substrate, such as the foam core of a sports board, such as a snow sled, will be better understood with reference to FIGS. 1-6. Starting at FIG. 1, die cut design 12 is cut into laminate sheet 10. Die cut design 12 may be cut using conventional stamping, like a "cookie cutter," laser cutting, water jet cutting, or similar cutting techniques. Die cut design 12 forms separable insert portion 16, which will be removed from laminate sheet 10 leaving an inlay aperture 18. Inlay aperture 18 is sized to provide a corresponding periphery to receive an inlay piece to be inserted into laminate sheet 10.

Figure 3:
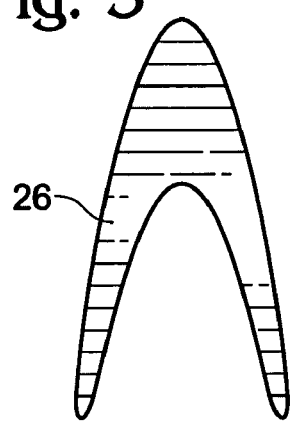
FIG. 3 is a plan view of the removed die cut inlay design from the laminate sheet of FIG. 2.
Figure 4:
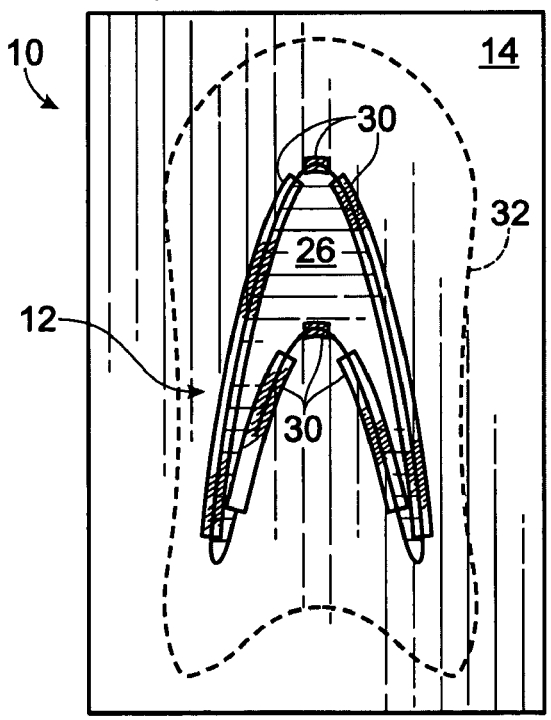
FIG. 4 is a plan view of the laminate sheet of FIG. 1, having the die cut inlay design removed, and showing the die cut inlay design of FIG. 3 taped into the cut out of the laminate sheet of FIG. 1, shown positioned over a core structure indicated by dashed lines.

As shown in FIG. 2, an inlay piece has been removed from second laminate sheet 20 leaving an inlay aperture 28. Insert portion, or inlay piece 26 is shown in FIG. 3. Inlay piece 26 is oriented to lie within inlay aperture 18 and secured to laminate sheet 10 by adhesive tape 30 stretched along and secured to opposites sides of the boundary defined by aperture 18, as shown in FIG. 4. Inlay piece 26 may be inlaid and secured in place manually, or using an automated process. Laminate sheet 10, with inlaid piece 26 taped into position or otherwise secured, is now shifted and placed directly over a substrate such as foam core 32, shown in dashed lines in FIG. 4. That foam core defines the outline of a sports board, such as a snow sled or bodyboard. While inlay piece 26 is shown taped into position it should be understood that other suitable means for securing inlay piece 26 may be used, such as an adhesive layer, or electrostatic bonds, etc.

Figure 5:
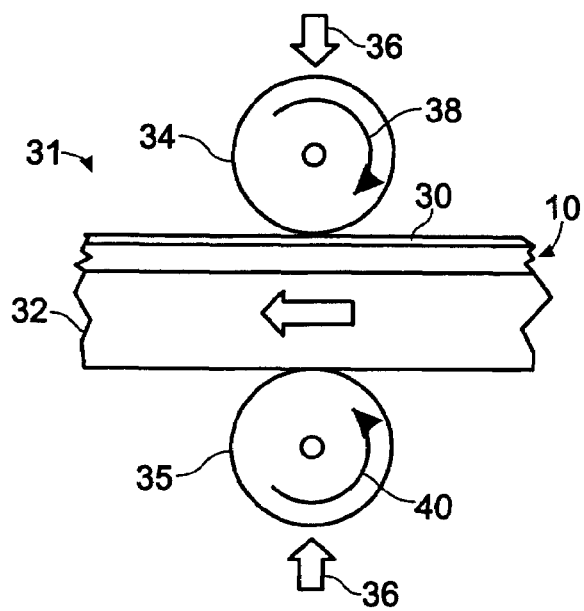
FIG. 5 is side view of the taped laminate sheet of FIG. 4 being fed through a laminating device and bonded to the surface of a core structure.

Laminate sheet 10 and substrate core 32 are then laminated together, as shown in FIG. 5. Substrate core 32 and laminate sheet 10 may be fed through a roll-press-laminating device 31, and heat in the range of about 375° F. ensures lamination. The laminating device may include a pair of rollers 34 and 35 positioned to sandwich laminate sheet 10 and substrate core 32 together as indicated by arrows 36. As shown in FIG. 5, roller 34 is adjacent laminate sheet 10 and may be heated to facilitate bonding between laminate sheet 10 and substrate core 32. Roller 34 rotates in the direction, as indicated by arrow 38, while roller 35 rotates in the opposite direction, as indicated by arrow 40, to move both the substrate core 32 and laminate sheet 10 through the laminating device.

Figure 6:
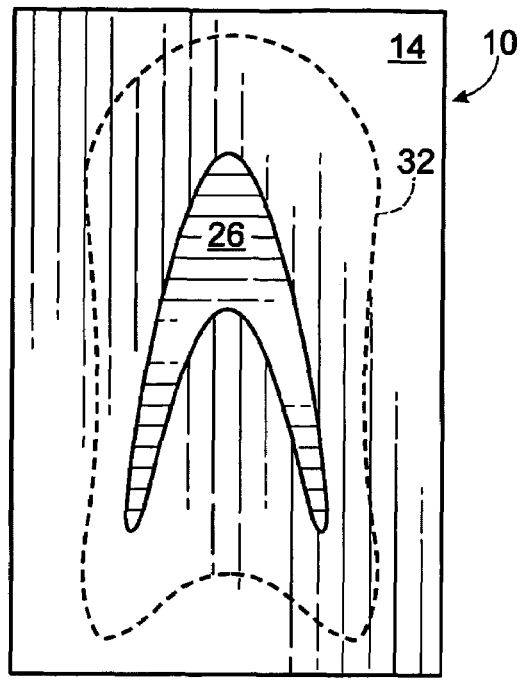
FIG. 6 is a plan view of the laminate sheet of FIG. 4 after it has been bonded to the core structure, showing the tape removed.

It can be seen that tape 30 may be secured in place while laminate sheet 10 is being bonded to substrate core 32 in the laminating device. Tape 30 ensures that inlay piece 26 remains properly aligned and secured in place during the laminating process. As a result of the laminating process, inlay piece 26 and laminate sheet 10 are both bonded in place to substrate core 32. Thereafter, the tape 30 may be removed. FIG. 6 shows laminate sheet 10 and inlay piece 26 bonded to substrate core 32 with tape 30 removed.

It should be understood that any die cut inlay design may be cut out of laminate sheets 10 and 20, provided two requirements are met. The first is that the design dimensions are contained within the boundary of the exterior edge of substrate core 32. The second requirement is that the design cut out of laminate sheet 10 be substantially the same size and shape as the design cut out of laminate sheet 20. The aperture formed in the die cutting process is maintained within the boundaries of the laminate sheet. This is important because it is necessary to bond the sheet, using the inlay to the substrate core.

After the laminated sheet 10 and inlay piece 26 have been laminated onto substrate core 32, the loose edges of the sheet are "heeled" around the chine and edges of the board, and are laminated to the chine by a heat gun. Excess material is then suitably trimmed away with a knife.

In the process shown, the laminate sheets may be sized about 22" wide by 46" or so in length, suitable for snow sled and bodyboard constructions.

The present invention avoids wastage of laminate sheet material in a production process. For example, as a die cut is made on one sheet to create an inlay portion, that first sheet is then available to receive an inlay portion or insert from a second sheet of material. Simultaneously, the second sheet is available to receive an inlay portion from the first sheet or some other sheet having a matching or congruent inlay design.

It should also be understood that the above-described process may be repeated on laminate sheet 20 with inlay piece 16 to form a composite with the material characteristics of laminate sheet 10 in the inlay design and the material characteristics of laminate sheet 20 in the surrounding portion.

Figure 7:
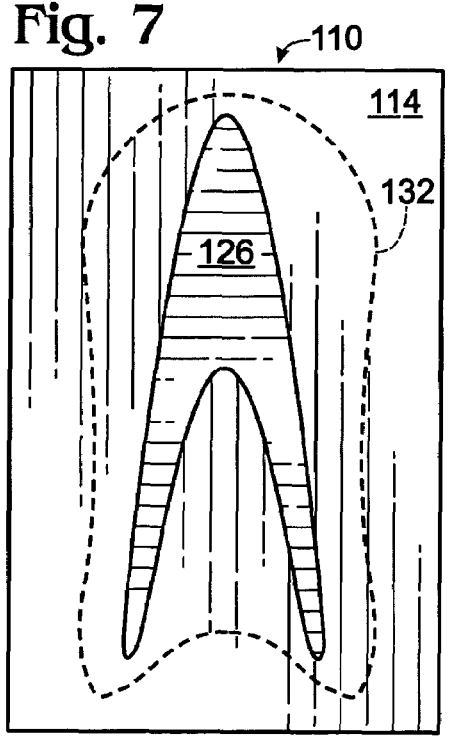
FIG. 7 is a laminated sheet according to the present invention after it has been bonded to a core structure, showing another embodiment of the die cut inlay design.
Figure 8:
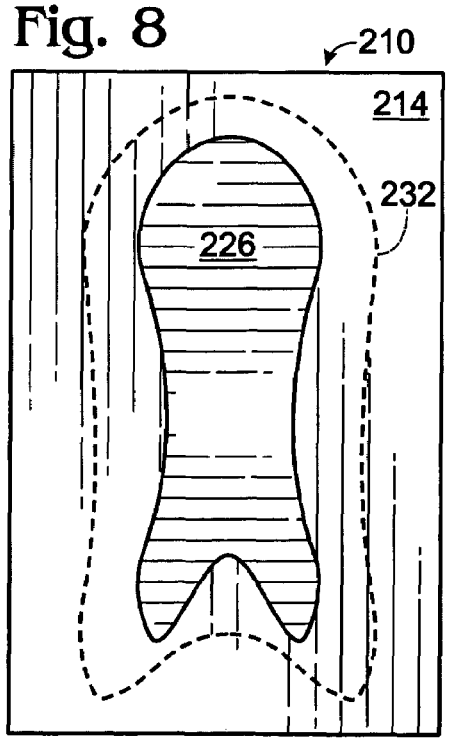
FIG. 8 is a laminated sheet according to the present invention after it has been bonded to a core, showing still another embodiment of the die cut inlay design.

FIGS. 7 and 8 show other embodiments of inlaid laminate sheets 110 and 210 respectively. Inlaid laminate sheet 110, having an inlaid piece 126 of a different design from inlaid piece 26, is bonded to a core substrate 132. Similarly, inlaid laminate sheet 210, having an inlaid piece 226 of a different design than inlaid pieces 26 or 126, is bonded to a core substrate 232.

FIGS. 9-21 illustrate yet another embodiment of the present invention, using a more complex die cut inlay design and three different laminate sheets. Some characteristic property of each laminate sheet is different from the other two laminate sheets, for example, the three sheets may all be different colors. While the example below, illustrated in FIGS. 9-21, includes three different laminate sheets, other combinations of more that three laminate sheets may be used in accordance with the present invention.

FIGS. 9 and 12 show a first laminate sheet top skin 310, similar to that described above. Top skin 310 includes a first characteristic property, for example, a yellow color. A die cut design, or inlay periphery 312 is cut into top skin 310. Die cut design 312 includes three sections or parts. A first section 312a defines a first portion of the design 312. A second section 312b defines a second portion of design 312. A third section 312c defies a third portion of design 312.

The three portions or sections 312a, 312b, and 312c combine together to form the entire die cut design 312. An expanse 314 of top skin 310 is sized to surround die cut design 312. Sections 312a, 312b, and 312c define the boundaries of a set of design inserts 316. Set of design inserts 316 includes a first insert 316a, which is bounded by design section 312a. Set of design inserts 316 includes a second insert 316b, which is bounded by design section 312b. Finally, set of design inserts 316 includes a third insert 316c, which is bounded by design section 312c.

An aperture 318, shown more clearly in FIG. 12, is formed when each of inserts 316a, 316b, and 316c, are removed from within expanse 314. Aperture 318 is sized to accommodate each of the inserts of set 316 when the inserts are arranged in a proper configuration, similar to the pieces of a puzzle. It will be understood that multiple designs may be used, and the design illustrated is FIGS. 9-21 is not limiting, but merely used for purposes of illustration.

FIGS. 10 and 13 show a second laminate sheet top skin 320, similar to that described above. Top skin 320 includes a second characteristic property different from top skin 310's first characteristic property. For example, top skin 320 may include a blue color. A die cut design, or inlay periphery 322 is cut into top skin 320. Like die cut design 312, die cut design 322 includes three sections or parts. A first section 322a defines a first portion of design 322. A second section 322b defines a second portion of design 322. A third section 322c defines a third portion of design 322.

The three portions or sections 322a, 322b, and 322c combine together to form the entire die cut design 322. An expanse 324 of top skin 320 is sized to surround die cut design 322. Sections 322a, 322b, and 322c define the boundaries of a set of design inserts 326. Set of design inserts 326 includes a first insert 326a, which is bounded by design section 322a. Additionally, set of design inserts 326 includes a second insert 326b, which is bounded by design section 322b. Finally, set of design inserts 326 includes a third insert 326c, which is bounded by design section 322c.

An aperture 328 is formed when each of inserts 326a, 326b, and 326c, are removed from within expanse 324, as shown in FIG. 13. Aperture 328 is sized to accommodate each of the inserts of set 326 when the inserts are arranged in a proper configuration, similar to the pieces of a puzzle.

It should be noted that die cut design 322 is a congruent to die cut design 312. That is to say that die cut design 312 and 322 are sized and shaped such that each part of the design match. Therefore, insert 316a and insert 326a are sized and shaped to match. Similarly, insert 316b and 326b are sized and shaped to match. Finally, insert 316c and 326c are sized and shaped to match. Because of the congruent size and shape of the inserts, the inserts become interchangeable when producing inlay patterns, as will be explained in more detail below.

FIGS. 11 and 14 show a third laminate sheet top skin 340, which is similar to that described above. Top skin 340 includes a third characteristic property different from both the first characteristic property of top skin 310 and second characteristic property of top skin 320. For example, the their characteristic property may be a black color.

As was the case with top skins 310 and 320, a die cut design, or inlay periphery 342 is cut into top skin 340. Die cut design 342 includes three sections or parts. A first section 342a defines a first portion of the design 342. A second section 342b defines a second portion of design 342. A third section 342c defines a third portion of design 342.

The three portions or sections 342a, 342b, and 342c combine together to form the entire die cut design 342. An expanse 344 of top skin 340 is sized to surround die cut design 342. Sections 342a, 342b, and 342c define the boundaries of a set of design inserts 346. Set of design inserts 346 includes a first insert 346a, which is bounded by design section 342a. Set of design inserts 346 includes a second insert 346b, which is bounded by design section 342b. Finally, set of design inserts 346 includes a third insert 346c, which is bounded by design section 342c.

An aperture 348 is formed when each of inserts 346a, 346b, and 346c are removed from within expanse 344, as shown in FIG. 14. Aperture 348 is sized to accommodate each of the inserts of set 346 when the inserts are arranged in a proper configuration, similar to the pieces of a puzzle.

It should be noted, similar to as discussed above with reference to die cut designs 312 and 322, that die cut design 342 is a congruent to die cut designs 312 and 322. That is to say that, die cut design 312, 322 and 342 are sized and shaped such that each part of the design match. Therefore, insert 316a, insert 326a, and insert 346a are sized and shaped to match. Similarly, insert 316b, insert 326b, and insert 346b are sized and shaped to match. Finally, insert 316c, insert 326c, and insert 346c are sized and shaped to match. Because of the congruent size and shape of the inserts the inserts become interchangeable when producing inlay patterns, as will be explained in more detail below.

FIGS. 15-17 show how the three top skins 310, 320, and 340 may be assembled to form three different inlay designs without wasting any of the material from the die cut process. As shown in FIG. 15, the aperture 318 of tops skin 310 may be filled with inserts cut out of top skins 320 and 340 to form a composite inlay design in the aperture. As shown, insert 326a, 346b, and 326c are used to fill inlay aperture 318 of top skin 310 and form a composite inlay design.

As shown in FIG. 16, the aperture 328 of top skin 320 may be filled with inserts cut out of tops skins 310 and 340. As shown, inserts 346a, 316b and 346c are used to fill inlay aperture 328 of top skin 320 to form a composite inlay design.

As shown in FIG. 17, the aperture 348 of top skin 340 may be filled with inserts cut out of tops skins 310 and 320. As shown, inserts 316a, 326b, and 316c are used to fill inlay aperture 348 of top skin 340 to form a composite inlay design.

FIG. 18, shows top skin 310 with the composite inlay design described with reference to FIG. 15. A layer of bonding material 350 overlaid on the composite insert may be used to secure the insert pieces of the inlay pattern in place, as will be further explained with reference to FIG. 19. The bonding material may be a thin polyethylene sheet, or any suitable material capable of holding the composite inlay in place. Bonding material 350 may include an adhesive, or may only bond to the top skin upon application of heat and pressure.

FIG. 19 illustrates a method securing bonding material 350 to top skin 310 for holding the composite inlay design in place. A heat source 352 may be used in conjunction with a Teflon, or similar non-stick layer 354 to prevent bonding material 350 from sticking to heats source 352. Heat and pressure may be applied to bonding material 350 to provide a uniform bonding to top skin 310. It will be understood that, the bonding step may be carried out by using a heat source, such as an iron of the type typically used to iron clothes, to bond the bonding layer to top skin 310. In that case the process is carrier out by hand and a sheet of Teflon or other nonstick material separates the iron from the bonding layer to prevent it from sticking to the iron.

FIG. 20 illustrates a lamination process similar to that described with reference to FIG. 5 above. However, top skin 310 is flipped over so that the side being bonded to sports board core 332, is the side of the top skin that includes the bonding material 350. So as shown, top skin 310 and substrate core 332 may be fed through a roll-press-laminating device 331, and heat in the range of about 375° F. ensures lamination. The laminating device may include a pair of rollers 334 and 335 positioned to sandwich top skin 310, bonding layer 350, and substrate core 332 together as indicated by arrows 336. Roller 334 is adjacent top skin 310 and may be heated to facilitate bonding between top skin 310 and substrate core 332. Roller 334 rotates in a first direction, as indicated by arrow 338, while roller 335 rotates in a second opposite direction, as indicated by arrow 339, to move both the substrate core 332 and top skin 310 through the laminating device.

After lamination is complete, a sports board having a composite inlay including insert 326c, 346b, and 326a, has been formed, as shown in FIG. 21. It should be understood that sports board with composite inlays having different combinations of inserts may be formed using the same process described for the sports board shown in FIG. 21. For example, a sports board having a composite inlay having inserts 346a, 316b, and 346c may be use to form a composite inlay from top skin 320. Additionally, as another example, a sports board having a composite inlay having inserts 316a, 326b, and 316c may be use to form a composite inlay from top skin 340.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

We claim:

1. A method of inlaying a design into a laminate sheet and bonding the inlaid laminate sheet to a foam core of a sports board, comprising:

cutting an aperture out of a first flexible laminate sheet;

cutting a congruent insert from a second flexible laminate sheet to be placed in the aperture of the first flexible laminate sheet;

placing the congruent insert in the aperture of the first flexible laminate sheet;

securing the congruent insert in place in the aperture of the first flexible laminate sheet;

placing the first flexible laminate sheet with the congruent insert secured in the aperture of the first flexible laminate sheet over a foam core of a sports board; and laminating the first flexible laminate sheet and the congruent insert secured in the aperture of the first flexible laminate sheet to the foam core using heat and pressure.

2. The method of claim 1, wherein the first flexible laminate sheet and the second flexible laminate sheet are different from one another in at least one material characteristic.

3. The method of claim 2, wherein the at least one material characteristic is color.

4. The method of claim 2, wherein the at least one material characteristic is a surface property.

5. The method of claim 4, wherein the surface property is the coefficient of friction.

6. The method of inlaying of claim 1, wherein cutting the aperture out of the first flexible laminate sheet is accomplished using the same method as cutting the congruent insert out of the second flexible laminate sheet.

7. The method of inlaying of claim 6, wherein the cutting is done using a die cut operation.

8. The method of inlaying of claim 1, wherein the first and second flexible laminate sheets are made from a polymer material selected from the group consisting of polyethylene, polystyrene, polypropylene, and polyvinylchloride.

9. The method of inlaying of claim 1, wherein securing the congruent insert in the aperture of the first flexible laminate sheet includes taping the congruent insert in place.

10. The method of inlaying of claim 1, wherein laminating the first flexible laminate sheet and the congruent insert to the core structure includes feeding the core structure, the first flexible laminate sheet, and the congruent insert through a roll-press-laminating device.

11. A method of inlaying a design into a laminate sheet and bonding the inlaid laminate sheet to a foam core of a sports board, comprising:

cutting an aperture out of a first flexible laminate sheet creating a first insert;

cutting a congruent second insert from a second flexible laminate sheet to be placed in the aperture of the first flexible laminate sheet leaving an aperture in the second flexible laminate sheet;

placing the first insert in the aperture of the second flexible laminate sheet and placing the congruent second insert in the aperture of the first flexible laminate sheet;

securing the first insert in place in the aperture of the second flexible laminate sheet and securing the congruent second insert in place in the aperture of the first flexible laminate sheet;

placing the first flexible laminate sheet with the second congruent insert secured in the first inlay aperture over a first foam core of a first sports board, and placing the second flexible laminate sheet with the first insert secured in the second inlay aperture over a second foam core of a second sports board; and laminating the first flexible laminate sheet and the congruent second insert to the first foam core using heat and pressure and laminating the second flexible laminate sheet and the first insert to the second foam core using heat and pressure.

12. The method of claim 11, wherein the first flexible laminate sheet and the second flexible laminate sheet are different from one another in at least one material characteristic.

13. The method of claim 12, wherein the at least one material characteristic is color.

14. The method of claim 12, wherein the at least one material characteristic is a surface property.

15. The method of claim 14, wherein the surface property is the coefficient of friction.

16. The method of inlaying of claim 11, wherein cutting the aperture out of the first flexible laminate sheet is accomplished using the same method as cutting the congruent second insert out of the second flexible laminate sheet.

17. The method of inlaying of claim 16, wherein the cutting is done using a die cut operation.

18. The method of inlaying of claim 11, wherein the first and second flexible laminate sheets are made from a polymer material selected from the group consisting of polyethylene, polystyrene, polypropylene, and polyvinylchloride.

19. A method of inlaying a design into a laminate sheet and bonding the inlaid laminate sheet to a foam core of a sports board, comprising:
    cutting an inlay design having at least two parts out of a first flexible laminate sheet leaving an inlay aperture;
    cutting a congruent insert having at least two parts from a second flexible laminate sheet leaving an inlay aperture, wherein at least one of the parts is placed in the inlay aperture of the first flexible laminate sheet;
    cutting a congruent insert having at least two parts from a third flexible laminate sheet leaving an inlay aperture, wherein at least one part is to be placed in the inlay aperture of the first flexible laminate sheet;
    aligning at least one part of the congruent insert from the second flexible laminate sheet in the inlay aperture of the first flexible laminate sheet;
    aligning at least one part of the congruent insert from the third flexible laminate sheet in the inlay aperture of the first flexible laminate sheet, thereby filling the inlay aperture of the first flexible laminate sheet;
    securing the congruent inserts from the second and third flexible laminate sheets in place in the inlay aperture of the first flexible laminate sheet;
    placing the first flexible laminate sheet with the congruent inserts from the second and third flexible laminate sheets secured in the inlay aperture of the first flexible laminate sheet over a foam core of a sports board; and
    laminating the first flexible laminate sheet with the congruent inserts secured in the inlay aperture to the foam core using heat and pressure.

20. The method of claim 19, wherein the first flexible laminate sheet, the second flexible laminate sheet and the third flexible laminate sheet are different from one another in at least one material characteristic.

21. The method of claim 20, wherein the at least one material characteristic is color.

22. The method of claim 20, wherein the at least one material characteristic is a surface property.

23. The method of claim 22, wherein the surface property is the coefficient of friction.

24. The method of inlaying of claim 19, wherein cutting the inlay design out of the first flexible laminate sheet is accomplished using the same method as cutting the congruent insert out of the second flexible laminate sheet and out of the third flexible laminate sheet.

25. The method of inlaying of claim 24, wherein the cutting is done using a die cut operation.

26. The method of inlaying of claim 19, wherein the first, second and third flexible laminate sheets are made from a polymer material selected from the group consisting of polyethylene, polystyrene, polypropylene, and polyvinylchloride.

27. The method of inlaying of claim 19, wherein securing the congruent inserts in the inlay aperture includes bonding a layer of polymer sheet over the congruent inserts; and
    wherein placing the first flexible laminate sheet with the congruent inserts over the foam core includes placing the first flexible laminate sheet with the congruent inserts over the foam core so that the polymer sheet is between the first flexible laminate sheet and the foam core.

28. The method of inlaying of claim 27, wherein the polymer sheet is a polyethylene sheet.

29. The method of inlaying of claim 19, wherein laminating the first flexible laminate sheet to the foam core includes feeding the foam core and the first flexible laminate sheet through a roll-press-laminating device.

30. A method of inlaying a design into a laminate sheet and bonding the inlaid laminate sheet to a foam core of a sports board, comprising:
    cutting a multipart inlay design out of a first flexible laminate sheet creating a first set of inserts and leaving a first inlay aperture in the first flexible laminate sheet;
    cutting a congruent second set of inserts from a second flexible laminate sheet leaving a second inlay aperture in the second flexible laminate sheet;
    cutting a congruent third set of inserts from a third flexible laminate sheet leaving a third inlay aperture in the third flexible laminate sheet;
    aligning at least one insert from the second set of inserts in the first inlay aperture and aligning at least one insert from the third set of inserts in the first inlay aperture;
    securing the at least one insert from the second set of inserts and securing the at least one insert from the third set of inserts in place in the first inlay aperture;
    placing the first flexible laminate sheet with the inserts secured in the first inlay aperture over a first foam core of a first sports board; and
    laminating the first flexible laminate sheet to the first foam core using heat and pressure.

31. The method of claim 30, further comprising:
    aligning at least one insert from the first set of inserts in the second inlay aperture and aligning at least one insert from the third set of inserts in the second inlay aperture;
    securing the at least one insert from the first set of inserts and securing the at least one insert from the third set of inserts in place in the second inlay aperture;
    placing the second flexible laminate sheet with the inserts secured in the second inlay aperture over a second foam core of a second snorts board; and
    laminating the second flexible laminate sheet to the second foam core using heat and pressure.

32. The method of claim 30, further comprising:
    aligning at least one insert from the first set of inserts in the third inlay aperture and aligning at least one insert from the second set of inserts in the third inlay aperture;
    securing the at least one insert from the first set of inserts and securing the at least one insert from the second set of inserts in place in the third inlay aperture;

placing the third flexible laminate sheet with the inserts secured in the third inlay aperture over a third foam core of a third sports board; and laminating the third flexible laminate sheet to the third foam core using heat and pressure.

33. The method of claim 30, wherein the first flexible laminate sheet, the second flexible laminate sheet and the third flexible laminate sheet are different in at least one material characteristic.

34. The method of claim 33, wherein the at least one material characteristic is color.

35. The method of claim 33, wherein the at least one material characteristic is a surface property.

36. The method of claim 33, wherein the surface property is the coefficient of friction.

* * * * *